United States Patent
Mikelson

(10) Patent No.: US 10,076,100 B2
(45) Date of Patent: Sep. 18, 2018

(54) LARIAT DEVICE AND METHOD OF MANUFACTURE

(71) Applicant: Albert Dale Mikelson, Franktown, CO (US)

(72) Inventor: Albert Dale Mikelson, Franktown, CO (US)

(*) Notice: Subject to any disclaimer, the term of this patent is extended or adjusted under 35 U.S.C. 154(b) by 0 days.

(21) Appl. No.: 15/666,428

(22) Filed: Aug. 1, 2017

(65) Prior Publication Data

US 2018/0027770 A1 Feb. 1, 2018

Related U.S. Application Data

(60) Provisional application No. 62/369,515, filed on Aug. 1, 2016.

(51) Int. Cl.
  *A01K 15/00* (2006.01)
  *D02G 3/38* (2006.01)
  *D02G 3/28* (2006.01)
  *D02G 3/44* (2006.01)

(52) U.S. Cl.
  CPC ............ *A01K 15/003* (2013.01); *D02G 3/28* (2013.01); *D02G 3/38* (2013.01); *D02G 3/44* (2013.01)

(58) Field of Classification Search
  CPC ... D07B 1/02; D07B 1/06; D07B 1/08; D07B 1/22; D07B 1/00; D07B 7/00; A07B 3/00; A07B 3/02
  USPC ............................................. 5/237; 57/7, 25
  See application file for complete search history.

(56) References Cited

U.S. PATENT DOCUMENTS

| | | | | |
|---|---|---|---|---|
| 1,275,103 A | * | 8/1918 | Swanson ................. | D03D 3/00 140/71 R |
| 2,326,621 A | * | 8/1943 | Corda ...................... | D07B 3/14 57/25 |
| 2,593,984 A | * | 4/1952 | Clary, Jr. ................. | D07B 3/00 57/58.55 |
| 2,661,240 A | * | 12/1953 | Salomonsson .......... | A47L 15/23 134/174 |
| 2,867,969 A | * | 1/1959 | Beyer .................... | D01H 7/868 57/115 |
| 2,973,617 A | * | 3/1961 | Weinberger .......... | B65H 63/061 57/86 |
| 3,298,401 A | * | 1/1967 | Stutz .................. | B65H 63/0321 139/370.1 |
| 3,332,125 A | * | 7/1967 | Davis ..................... | D02G 1/162 28/243 |
| 3,783,597 A | * | 1/1974 | Greive ................. | D01H 13/106 242/128 |
| 3,805,344 A | * | 4/1974 | Bartnicki .............. | D02G 1/162 226/108 |
| 3,835,511 A | * | 9/1974 | Schrader ............... | D02G 1/162 28/252 |
| 4,455,818 A | * | 6/1984 | Sugimoto ............. | H01B 13/04 174/117 F |

(Continued)

*Primary Examiner* — Shaun R Hurley
*Assistant Examiner* — Bao-Thieu L Nguyen
(74) *Attorney, Agent, or Firm* — Critical Path IP Law, LLC

(57) ABSTRACT

Methods and systems for ropes used to catch livestock such as a cattle roping lariat. In one embodiment, the lariat includes a set of strands, each strand including a set of yarns surrounding a central core. The set of strands are twisted to form a twisted rope. The lariat is manufactured using a set of components including a head box, a tree-cross box with a branched strand tree device and a cross device, and a tail box.

20 Claims, 15 Drawing Sheets

(56) References Cited

U.S. PATENT DOCUMENTS

| | | | | | |
|---|---|---|---|---|---|
| 4,802,328 | A | * | 2/1989 | Senyagin | D07B 7/025 57/311 |
| 5,107,668 | A | * | 4/1992 | Dammann | B65H 54/71 242/473.5 |
| 5,107,671 | A | * | 4/1992 | Morihashi | D02G 3/281 57/328 |
| 5,351,469 | A | * | 10/1994 | Karolyi | D01H 15/013 242/475.2 |
| 5,694,826 | A | * | 12/1997 | Slivinski | D04C 7/00 289/15 |
| 5,797,255 | A | * | 8/1998 | Saito | D01H 9/046 57/267 |
| 5,941,198 | A | * | 8/1999 | Sullivan | A01K 15/003 119/805 |
| 6,119,632 | A | * | 9/2000 | Sullivan | A01K 15/003 119/805 |
| 6,142,104 | A | * | 11/2000 | Sullivan | A01K 15/003 119/805 |
| 6,457,668 | B1 | * | 10/2002 | Jaschke | B65H 54/34 242/473.8 |
| 6,470,664 | B1 | * | 10/2002 | Sullivan | A01K 15/003 57/295 |
| 6,619,240 | B2 | * | 9/2003 | Sullivan | A01K 15/003 119/805 |
| 2002/0189552 | A1 | * | 12/2002 | Sullivan | A01K 15/003 119/805 |
| 2016/0348289 | A1 | * | 12/2016 | Shah | D04C 3/48 |

* cited by examiner

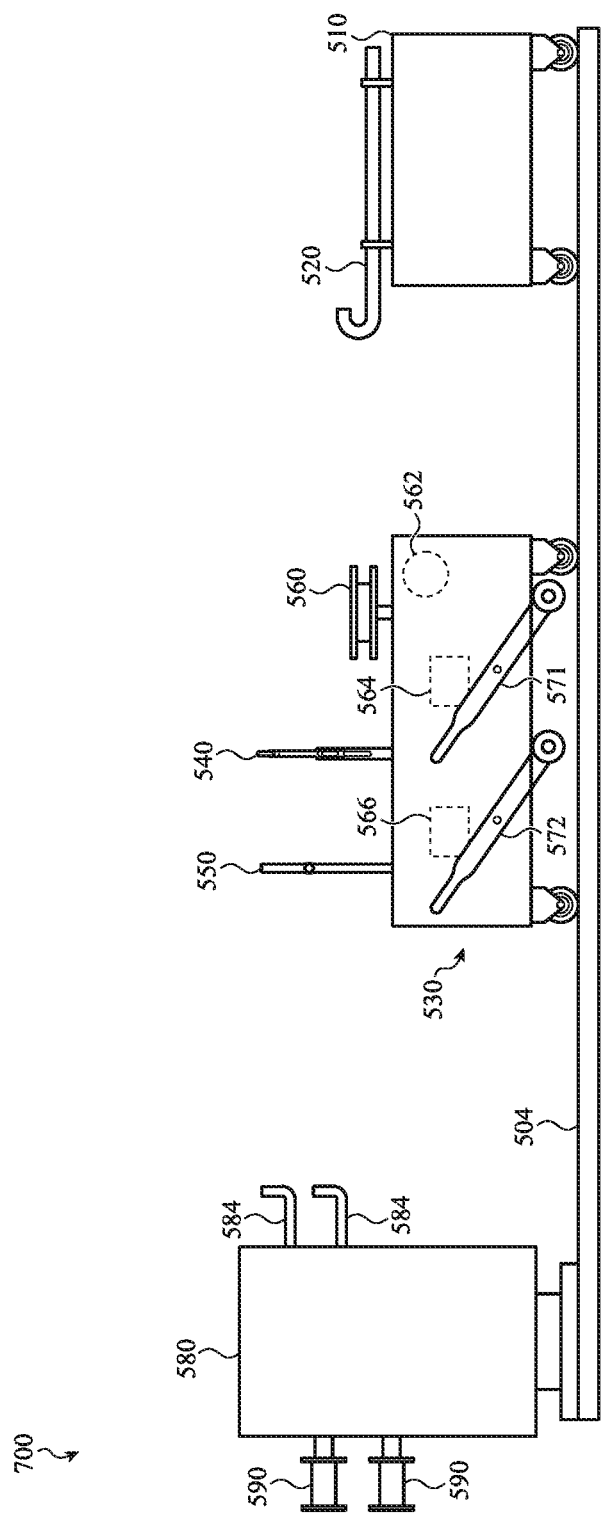

LARIAT DEVICE AND METHOD OF MANUFACTURE

CROSS-REFERENCE TO RELATED APPLICATION

This application is a nonprovisional patent application of and claims the benefit of U.S. Provisional Patent Application No. 62/369,515, filed Aug. 1, 2016 and titled "Static and Lateral Dynamic Controlled Cattle Roping Lariat," the disclosure of which is hereby incorporated herein by reference in its entirety.

FIELD

The disclosure relates generally to ropes, and specifically to ropes used to catch livestock such as a cattle roping lariat.

BACKGROUND

The rope used to catch and control animals (cattle, sheep, goats, etc.), horses or other livestock is called a lariat or lasso. Such ropes have been used for centuries to catch and secure animals for many different acts of animal husbandry. A lariat or lasso is a rope of fixed length that allows one end, called the tail, to slide through a small loop on the other end, called a honda, so that the resulting loop formed after a majority of the lariat is pulled through the honda can be used to catch and secure the head or feet of an animal.

For several generations the lariat has been used in timed competitions between individuals or groups of individuals. Some of the roping competitions are between individuals and others are between teams of two to four members. Winning success is significantly determined by the performance characteristics of the lariat. Competitors seek to select a lariat which best fits their roping style and ability.

The competitive roping event that draws the largest number of entries is the team roping competition. The event involves two persons, each person riding a horse with a saddle with a saddle horn for wrapping a lariat. One person is called a header, whose goal is to rapidly throw the loop of his lariat around the head or horns of the animal, usually referred to as a steer, that is running ahead of his horse, followed by rapidly decreasing the size of the loop thrown to tighten on the head or the steer's horns and wrapping his or her lariat around the horn of his saddle. The header then leads the steer in a manner such that his team member, called a heeler, can attempt to rope both hind feet with the loop in his lariat, draw the loop tight around the legs of the steer and rapidly wrap his lariat around the horn on his saddle while stopping his horse. The event is completed with the steer being secured between tight header and healer lariats and with each competitor's horse facing the steer.

Several other rules determine the success of each team's competition or run, but the first and absolute requirement is that the header and healer must rapidly rope and successfully secure the steer to their saddle horn. The throwing, catching and securing of the rope to the saddle horn of the steer's head and feet must be done rapidly and without error in order to share in the prize monies paid to the fastest teams. In many team-roping events, the entire event or run must be complete in less than five seconds to share in the prize money. To be competitive in other roping competitions, such as those involving only one person, requires the run to be complete with even faster times.

Because of the need in the team roping event to rapidly catch and secure to the saddle horn the steer's head and hind feet, the lariats being used by the header and heeler must have both the static and dynamic characteristics that allow the highest probability of success. Headers and healers usually use lariats with different static characteristics such as stiffness and weight. Both headers and healers seek a rope with good, and predictable, dynamic characteristics: such ropes are unavailable to today with conventional lariats.

Over the last half century many improvements in the design and construction of lariats have been made with the use of manmade fibers, e.g. nylon and polyester have replaced grass ropes of natural materials like hemp. The use of these new materials and improved methods of construction has improved the ability to produce a stiffer rope, sometimes called by competitors a harder rope or one with more body. New materials and construction machines have allowed not only the stiffness of the rope, but also a lariat's diameter, to be varied to improve the inventory of ropes available.

Most competitions requiring the roping and securing of animals are done using a lariat produced by twisting threads, strings or yarns made of multifilament or monofilament fibers into strands and then twisting the strands around each other to form the length of the lariat (sometimes also sometimes referred as a body.) Some of these lariats have a central core strand about which the twisted strands are twisted in a manner similar to the core twisted ropes that have been manufactured for centuries for other uses. However, the manufacturing of twisted ropes with measurable and repeatable static and dynamic characteristics has not been accomplished.

The design and construction of a lariat with selectable and consistent static and dynamic characteristics is provided in this disclosure. The disclosed lariat would allow a competitor user to reliably select a rope that fits his or her preferred lariat rope feel or body.

The disclosure involves a unique twisted lariat rope and method of manufacturing of a unique twisted lariat rope. The lariat rope provides improved performance over conventional lariat ropes. For example, the lariat rope of the disclosure provides more predictable static and lateral dynamic qualities than existing lariat ropes, thus increasing the likelihood of completing his loop delivery, catching and correctly securing control of the animal that he is roping. The lariat of the disclosure may not be manufactured using conventional equipment and devices without major modification; the disclosure provides a method of manufacturing the disclosed lariat.

Most competitive ropes are twisted ropes. However, some braided or woven ropes are used as ranch ropes or in competitive big loop livestock roping competitions. The design and construction of the disclosed lariat, with selectable and consistent static and dynamic characteristics, is that of a twisted rope.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

SUMMARY

In one embodiment, a lariat device is disclosed, the lariat device comprising: at least three strands, each strand having a length and comprising a plurality of yarns and a center yarn; wherein: the plurality of yarns of each of the at least three strands encircle a respective center yarn; and the at least three strands are twisted with respect to one another. In one embodiment, each of the center yarns is a plurality of yarns. In one embodiment, the plurality of yarns comprise multifilament and monofilament yarn materials. In one embodiment, the multifilament yarn materials are untwisted. In one embodiment, the at least three strands define a void or opening or gap along a central axis of the lariat device. In one embodiment of the lariat, the three strands have a twist of at least two and a half twists per inch along the axial length of the lariat. In one embodiment of the lariat, the at least three strands have a twist of at least 2.5 twists per inch along an axial length of the lariat device. In one embodiment, the lariat device is further configured to rope livestock. In one embodiment, the at least three strands are three strands; the three strands define a void along a central axis of the lariat device; and the plurality of yarns are untwisted monofilament yarns.

In another embodiment, a branch strand tree device used to manufacture a lariat is disclosed, the branch strand tree device comprising: a trunk portion comprising at least three branches extending from the trunk, each branch comprising at least two twigs extending from a respective branch; wherein: each of the at least two twigs form a crotch and an aperture configured to receive a yarn or a strand through the aperture. In one embodiment, the at least three branches are three branches, and the at least two twigs are two twigs. In one embodiment, the branch strand tree device further comprises an aperture formed at a distal end of each branch.

In another embodiment, a method of making a lariat device is disclosed, the method comprising: providing a head box comprising a plurality of head box hooks, a plurality of outer strand yarn spools, and a plurality of yarns coupled to each of the outer strand yarn spools; providing a tree/cross box comprising a cross and a branch strand tree; providing a tail box comprising a tail hook; connecting yarn between the head box hooks and the tail hook to form a plurality of strands; coupling each of the plurality of strands with a plurality of crotches of the branch strand tree; twisting the plurality of strands; and twisting the plurality of strands, wherein a lariat device is made. In one embodiment, the outer strand yarn spools are not positioned on the head box, but instead are positioned on an adjacent structure, such as a floor, a wall, or other stationary structure. (Throughout this disclosure the terms twisting weight or twisting weight activator mean any mechanical or electromechanical device used to define and control the resistance to movement of the tree cross box when the strands are being twisted or when the strands are being twisted together.) In one embodiment, the tree/cross box further comprises at least two twisting weights, each of the at least two twisting weights configured to impart a controlled twist to the plurality of strands when the plurality of strands are coupled to the plurality of crotches of the branch strand tree. In one embodiment, the tree/cross box further comprises at least two twisting activators, each twisting activator connected with and configured to displace a twisting weight; and the tree/cross box is moveable. In one embodiment, each of the tree/cross box and the tail box are moveable and engage a pair of rails. In one embodiment, the plurality of head box hooks are three head box hooks, and the plurality of outer strand yarn spools are three outer strand yarn spools. In one embodiment, the plurality of strands is three strands. In one embodiment, the three strands define a void along a central axis of the lariat device. In one embodiment, the branch strand tree is detached from the tree/cross box after the step of coupling each of the plurality of strands with a plurality of crotches of the branch strand tree. In one embodiment, the tree/cross box further comprises a cross, the cross positioned between the branch strand tree and the head box.

By way of providing additional background, context, and to further satisfy the written description requirements of 35 U.S.C. § 112, the following references are incorporated by reference in their entireties: U.S. Pat. No. 5,941,198 entitled "Cattle Roping Lariat;" U.S. Pat. No. 6,119,632 entitled "Lariat Rope Body and Method"; U.S. Pat. No. 6,142,104 entitled "Lariat Rope Body"; U.S. Pat. No. 6,470,664 entitled "Lariat, Lariat Rope Body, Method and Apparatus; and U.S. Pat. No. 6,619,240 entitled "Lariat Rope Body, Method and Apparatus."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 7 is a side view of another embodiment of a system used to manufacture a lariat device;

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure generally relates to a rope with defined performance characteristics as used as a cattle-roping lariat. In one embodiment, the rope includes a set of strands, each strand including a set of yarns surrounding a central core. The set of strands are twisted to form a twisted rope. The lariat is manufactured using a set of components including a branched strand tree and a cross device. The components used to manufacture the lariat device include a head box, a tree-cross box with a branched strand tree device and cross device, and a tail box.

The lariat rope provides improved performance over conventional lariat ropes. For example, the lariat rope of the disclosure provides more predictable static and lateral dynamic qualities than existing lariat ropes.

Figure 1A:
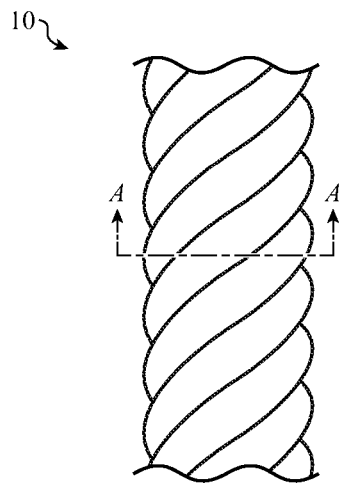
FIG. 1A is a side view of a portion of a lariat device of the prior art.
Figure 1B:
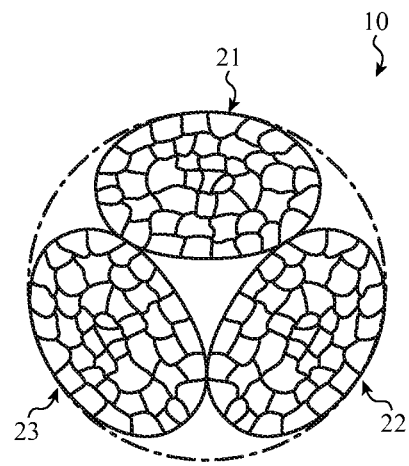
FIG. 1B is a cross-section view of the lariat device of FIG. 1A, taken along section A-A in FIG. 1A.
Figure 2A:
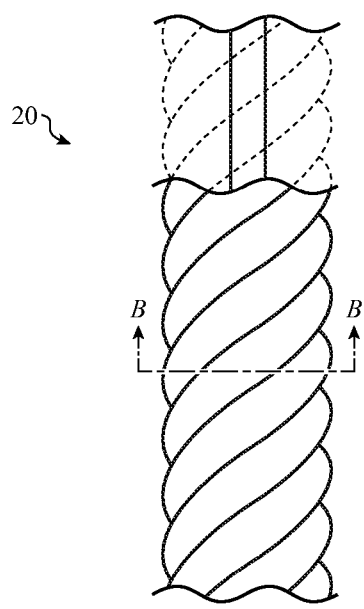
FIG. 2A is a side view of a portion of lariat device of the prior art.
Figure 2B:
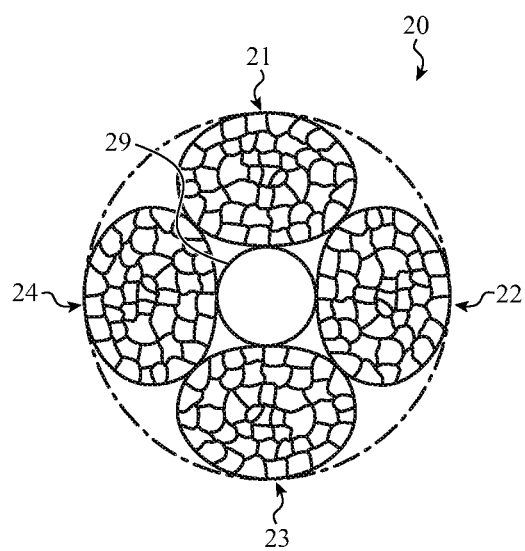
FIG. 2B is a cross-section view of the lariat device of FIG. 2A, taken along section B-B in FIG. 2A.

The conventional twisted lariat has a cross section similar to those depicted in FIGS. 1-2. FIGS. 1A-B depict a conventional lariat design of three strands without any center core and without any core within the strands. FIGS. 2A-B depict a conventional lariat design of four strands which collectively surround a single center strand core and without any core within the strands.

In FIGS. 1A-B, a conventional lariat device 10 of the prior art is depicted. FIG. 1A is a side view of a portion of a lariat device 10 of the prior art, and FIG. 1B is a cross-section view of the lariat device 10 of FIG. 1A, taken along section A-A in FIG. 1A. The lariat device 10 has three twisted strands, 21, 22, 23, arranged around a central void area. Each of the three twisted strands, 21, 22, 23 do not surround and do not encircle a central core.

In FIGS. 2A-B, a conventional lariat device 20 of the prior art is depicted. FIG. 2A is a side view of a portion of a lariat device 20 of the prior art, and FIG. 2B is a cross-section view of the lariat device 20 of FIG. 2A, taken along section B-B in FIG. 2A. The lariat device 20 has four twisted strands, 21, 22, 23, 24 which collectively are arranged around a single central strand core 29. Each of the four twisted strands, 21, 22, 23, 24 do not surround and do not encircle a central core.

Figure 3A:
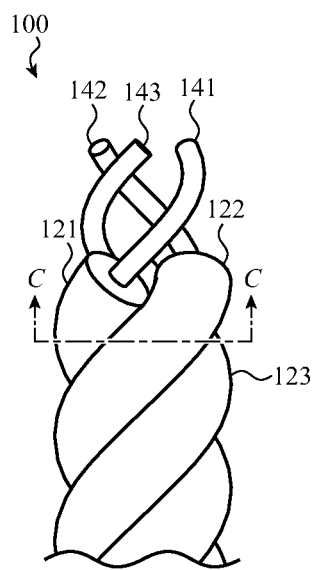
FIG. 3A is a side cut-away view of a portion of one embodiment of a lariat device of the disclosure.
Figure 3B:
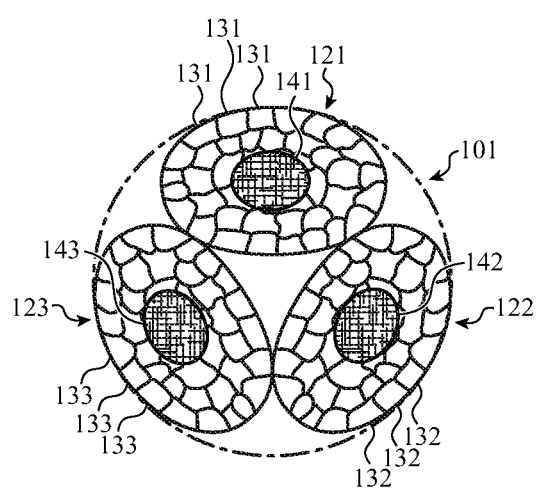
FIG. 3B is a cross-section view of the lariat device of FIG. 3A, taken along section C-C in FIG. 3A.

With attention to FIGS. 3A-B, one embodiment of the lariat device 100 of the disclosure is depicted. FIG. 3A is a side cut-away view of a portion of the lariat device 100, and FIG. 3B is a cross-section view of the lariat device 100 of FIG. 3A, taken along section C-C in FIG. 3A.

The lariat device 100 includes three intertwined or twisted strands: strand one 121, strand two 122, and strand three 123. Each strand 121, 122, 123 is composed of multiple yarns or a set of yarns or a plurality of yarns. The lariat device 100 of three twisted strands may be called a three-strand rope body. Strand one 121 is composed of a set of yarns one 131, strand two 122 is composed of a set of yarns two 132, and strand three 123 is composed of a set of yarns three 133. Each set of yarns of each strand 121, 122, 123 surrounds or encircles a center yarn, 141, 142, 143 respectively. Stated another way, the set of yarns one 131 surround or encircle center yarn one 141. Similarly, the set of yarns two 132 surround or encircle center yarn two 142, and the set of yarns three 133 surround or encircle center yarn three 143. Each of the three center yarns 141, 142, 143 forms an oblong or circular cross-section.

Each of the center yarns 141, 142, 143 may be of a substantially uniform materials, differing materials, and/or differing density or denier. For example, the center yarns 141, 142, 143 may each be of a single yarn. In another embodiment, each of the center yarns 141, 142, 143 comprise a set of yarns and/or may be of a variable density (with axial length or with radial distance from center.) The yarns may be mono- or multifilament yarns, plied yarns and/or cabled yarns and mixtures thereof.

The term "denier" is the weight in grams of material per 9000 meters of length. For example, if 9000 meters of yarn weighs 1650 grams, it is known as 1650 denier.

A "plied yarn" is a yarn made by plying, where plying is the process of twisting together two or more yarns in a direction opposite to the direction in which the yarns were spun. A "cabled yarn" is a yarn formed by twisting together two or more plied yarns.

The three strands 121, 122, 123 are twisted to form the lariat device 100, as illustrated in FIG. 3A. Stated another way, the three strands 121, 122, 123 twist or wrap around one another to form the lariat device 100. The material (e.g. composition), physical (e.g. geometrical), and/or performance characteristics of the three strands are substantially the same.

Each of the three strands 121, 122, 123 may form a circular, to include oblong, cross-sectional shape. Stated another way, the three strands together generally define or form a circular lariat profile 101. In another embodiment, the three strands together generally define or form an oblong lariat profile 101.

In one embodiment of the lariat device 100, the lariat device has a total denier of 425,268 and a completed lariat body with the strands Z twisted together resulting in a lariat with strand twist of three twists per inch. In one embodiment, each strand 121, 122, 123 are composed of outer strand bundles 131, 132, 133 surrounding a center yarn bundle 141,142,143. In one embodiment, each outer strand 131,132,133 comprises six plied and cabled yarns, each of which comprises two yarns plied together and then cabled with three outer yarns, wherein each of the individual yarns being 1260 denier 210 filament yarns designated as 1260-2(3.5Z)-3(3.5.S). Note that the designation 1260-2(3.4Z)-3 (3.07.S) means a cabled yarn made by twisting three plied yarns together by twisting in the S direction in an amount of about 3.5 turns or twists per inch (tpi) of cabled yarn in a known manner, each plied-yarn having been made by twisting two 1260 denier monofilament yarns together in the Z direction in an amount of about 3.5 tpi of plied yarn in a known manner.

In one embodiment, each center yarn 141, 142, 143 is a plied yarn composed of two 940-136 multifilament yarns plied together at 7 tpi in the S direction. In one embodiment, each strand 121, 122, 123 have a denier of 47,250.

In one embodiment of the lariat device 100, each strand of the lariat (e.g. each of strand 121, 122, 123) have a denier of between 40,000 and 55,000. In a more preferred embodiment of the lariat device 100, each strand of the lariat (e.g. each of strand 121, 122, 123) has a denier of between 30,000 and 43,000. In a most preferred embodiment of the lariat device 100, each strand of the lariat (e.g. each of strand 121, 122, 123) has a denier of between 25,000 and 35,000. In one embodiment of the lariat device, each strand of the lariat (e.g. each of strand 121, 122, 123) has a denier less than 48,000. In one embodiment of the lariat device, each strand of the lariat (e.g. each of strand 121, 122, 123) has a denier of about 47,250.

In one embodiment of the lariat device 100, the lariat device has a total denier of between 375,000 and 430,000 denier. In a more preferred embodiment, the lariat device 100 has a total denier of between 400,000 and 450,000 denier. In a most preferred embodiment, the lariat device 100 has a total denier of between 350,000 and 410,000 denier. In one embodiment of the lariat device 100, the lariat device has a total denier of about 425,000 denier.

In one embodiment of the lariat device 100, the lariat device has a total denier of less than 450,000. In a more preferred embodiment, the lariat device 100 has a total denier of less than 430,000. In a most preferred embodiment, the lariat device 100 has a total denier of less than 380,000.

In one embodiment, each strand 121, 122, 123 comprise multiple plied and cabled yarns around a center yarn 141, 142, 143. In one embodiment, each of the yarns of each of the set of yarns of 131, 132, 133 has 204 elements designated as 1260-2(3.5Z)-3(3.5 S). In one embodiment, each center yarn 141, 142, 143 is a plied yarn composed of two 940-136 multifilament yarns plied together at 7 tpi in the S direction. In one embodiment, each strand 121, 122, 123 have a denier of 47,250. Note that as yarns are plied the twist direction may be specified as S twist or Z twist. The twist is in the direction of the shape of the letter. That is, when holding a twisted yarn, thread, strand, rope body vertically, the S or Z shows a diagonal between twisted elements. An S twist or a left hand twist presents a diagonal moving up from lower right to the upper left. A Z twist presents a diagonal moving up from a lower left to an upper right.

In one embodiment of the lariat device 100, the denier is 425,268 composed of 408,240 denier from the outer strand yarns and 17,028 denier from the center yarns.

Figure 4:
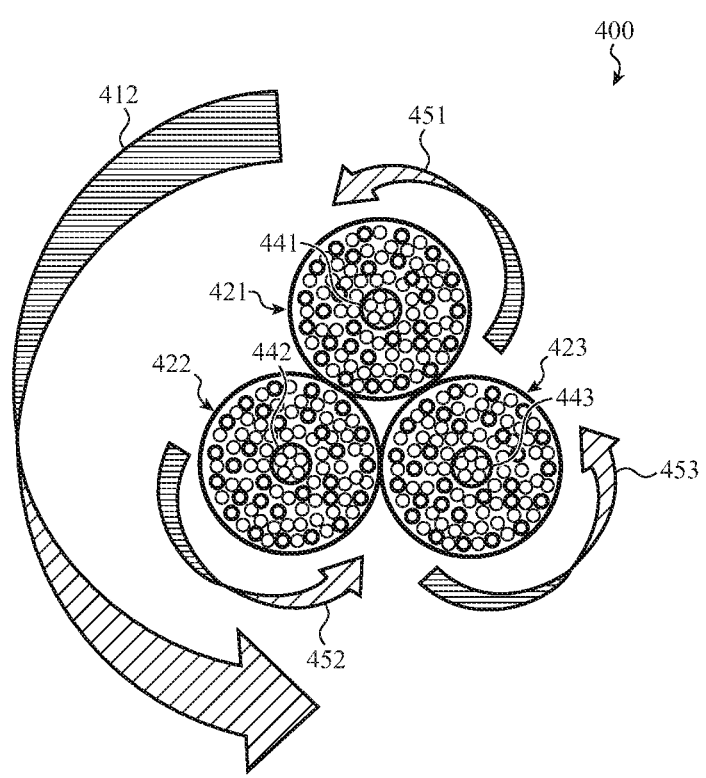
FIG. 4 is another cross-section view of the lariat device of FIG. 3A, taken along section C-C in FIG. 3A and illustrating twisting of portions of the lariat device.

FIG. 4 is another cross-section view of the lariat device of FIG. 3A, taken along section C-C in FIG. 3A and illustrating twisting in the Z direction of the strands of the lariat. FIG. 4 illustrates a similar although slightly different embodiment of the lariat device 400. The lariat device 400 includes three twisted strands: strand one 421, strand two 422, and strand three 423. Each strand 421, 422, 423 is composed of multiple yarns or a set of yarns (also termed a yarn bundle.) The set of yarns for each of the three strands 421, 422, 423 are depicted as more uniform in cross-section than those of FIG. 3B, and the cross-section of each of the three strands 421, 422, 423 are depicted as more circular (rather than oblong) relative to the embodiment of the lariat 100 of FIG. 3B.

Each set of yarns of each strand 421, 422, 423 surrounds or encircles a center yarn, 441, 442, 443 respectively. Each center yarn 441, 442, 443 comprise five (5) yarns. In other embodiments, each center yarn 441, 442, 443 comprise one or more yarns. In other embodiments, each center yarn 441, 442, 443 comprise a plurality of yarns. Each of the three center yarns 441, 442, 443 may separately form an oblong or circular cross-section.

The lariat 400 is configured with an overall lariat twist 412. Each of the three strands 421, 422, 423 of the lariat device 400 has a respective twist 451, 452, 453. Stated another way, strand one 421, with center yarn one 441, has a twist one 451. Similarly, strand two 422, with center yarn two 442, has a twist two 452, and strand three 423, with center yarn three 443, has a twist three 453. In one embodiment, the three twists 451, 452, 453 are substantially the same. The twisting of the lariat device 400 and the twisting of the strands 421, 422, 423 are discussed below with respect to FIGS. 4-9. Generally, the 451, 452, 453 twists are imparted to the lariat 400 as a result of the head box hooks each twisting a respective outer strand bundle yarn together against the crotches 644, 655, 664 of the branched tree device 640 of FIG. 6A and around the its center yarn bundle. This twisting results in the length of the twisted strands between the head box hooks and branch strand tree crotches to decrease while pulling the center yarns bundles through the branch strand tree apertures 644, 655, 664 and from the center yarn spools 360. More description of the process for manufacturing the lariat, and imparting various twists to the lariat, are provided below with respect to FIGS. 8-9.

Each center yarn (e.g., each of 141, 142, 143 of the lariat device 100 FIG. 3B) may contain a plurality of multifilament or monofilaments yarns that may be untwisted, or slightly twisted in either a S or Z direction before the lariat device 100 is manufactured. Although the embodiments of the lariat device 100, 400 described above each have three strands, the number of strands can be increased and materials changed for any of a number of performance characteristics and/or user preferences, such as to reduce lariat-to-saddle horn binding characteristics.

By varying the number of yarns, the number of yarns in a strand, the number or monofilaments in a yarn and the material and makeup of the yarns, the pre-twisting of yarns, the tensions applied while twisting strands into a twisted body, lariats can be made with the novel cross box and strand twisting mechanisms of the disclosure.

In one embodiment, the lariat device is impregnated and coated with a wax to create a smoother, slicker, and water-resistant exterior. In some embodiments, the lariat device may be of various colors of dyed mono- or multifilament yarns. In some embodiments, the lariat device may be coated or dusted with fine talc.

In some embodiments, the lariat device may be configured with different yarn tension levels during the lariat production process, thereby producing different twist numbers.

In some embodiments, the lariat device may be configured with combinations of nylon yarns. In some embodiments, the lariat device may be configured with combinations of plied yarns and/or cabled yarns, and of materials such as polyester and polyethylene.

With attention to FIGS. 3-9, additional details of the lariat device and the associated means of manufacturing are provided.

Figure 5:
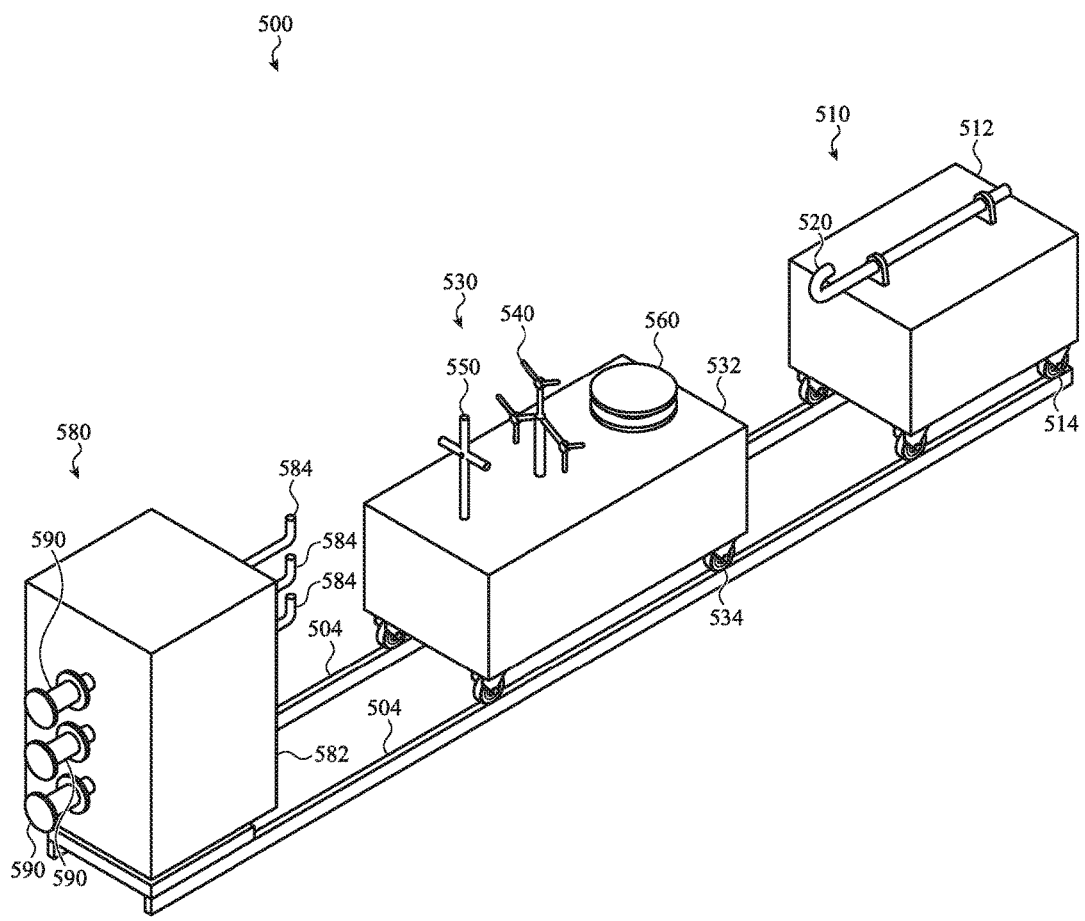
FIG. 5 is a simplified perspective view of one embodiment of a system used to manufacture the lariat device of FIG. 3A.

FIG. 5 is a simplified perspective view of one embodiment of a system 500 used to manufacture the lariat device of FIG. 3A. The system 500 generally comprises a head box 580, tree/cross box 530, and a tail box 510. The phrase "tree-cross-box" and "tree/cross box" have the same meaning. The head box 580, tree/cross box 530, and tail box 510 are generally linearly aligned. The lariat 100 of the disclosure cannot be manufactured by any conventional method and cannot be manufactured using conventional devices. For example, the lariat 100 of the disclosure may be manufactured using the below-disclosed methods, and using, among other things, the branched strand tree device described below.

Generally, the head box 580, in cooperation of the branch strand tree device on the tree/cross box 530, twists yarns into strands, and the tail box 510, in cooperation with the cross on the tree/cross box 530, twists the strands together to form a lariat.

In the embodiment of FIGS. 5 and 7-9, the head box 580 is stationary or fixed and the tail box 510 is movable. However, on an alternate embodiment, the head box 580 is moveable and the tail box 510 is fixed or stationary. Returning to FIG. 5, each of the tree/cross box 530 and tail box 510 are moveable and mounted on rails to allow predicable and ready linear movement relative to one another and with respect to head box 580. More specifically, the head box 580 is fixed and the tree/cross box 530 and tail box 510 are allowed, under controlled resistance, to move as the strands are twisted by the head box hooks 584 and the strands then worked (e.g. twisted) at the tree/cross box 530 in coordination with the tail box hook 520 (more description found at FIGS. 8-9 below.)

The head box 580 comprises a head box body 582, a plurality of head box hooks 584, and a plurality of outer strand yarn spools 590. The outer strand yarn spools 590 are disposed on or positioned on the head box body 582. In another embodiment, one or more outer strand yarn spools 590 are mounted adjacent to the head box 580, e.g. on wall, a floor, or any stationary member. In the embodiment of the system 500 of FIG. 5, the head box 580 comprises three outer strand yarn spools 590 mounted to one surface of the head box body 582, and three head box hooks 584 mounted to an opposite surface of the head box body 582. The outer strand yarn spools 590 are configured to secure, or hold, and to deploy yarn used in the manufacture of a lariat device. The head box hooks are configured to secure, or hold, and to impart a twist to yarn used in the manufacture of a lariat device. The three head box hooks 584 may be configured in a triangular arrangement, such that two head box hooks 584 are horizontally aligned and one head box hook 584 is fitted between and above the two lower head box hooks 584. However, other arrangements of the head box hooks may be used.

The tree/cross box 530 comprises a tree/cross box body 532, cross 550, branch strand tree 540, pulleys 560, and a set of four wheels 534 configured to engage the rails 504. Additional elements of the tree/cross box 530 (e.g. weights and activators are described with respect to FIG. 7.) Additional description of the branched tree device 540 is described with respect to FIGS. 6A-B below. Each of the cross 550, branch strand tree 540 and pulleys 560 are generally aligned and are disposed or positioned on an upper surface of the tree/cross box body 532. In one embodiment, the tree/cross box 530 is fitted with any device to enable controlled movement relative to the tail box 510 and/or the head box 580.

The tail box 510 comprises a tail box body 512, hook 520, and a set of four wheels 514 configured to engage the rails 504. In one embodiment, the tail box 510 is fitted with any device to enable controlled movement relative to the tree/cross box 530 and/or the head box 580.

In one embodiment, the system 500 comprises a conventional head box and a conventional tail box, with a modified conventional cross-box. The modified conventional cross-box is modified to include, among other things, the features, elements, and capabilities of the tree/cross box body 532 (and branched strand tree 540, 640) as disclosed herein.

Figure 6A:
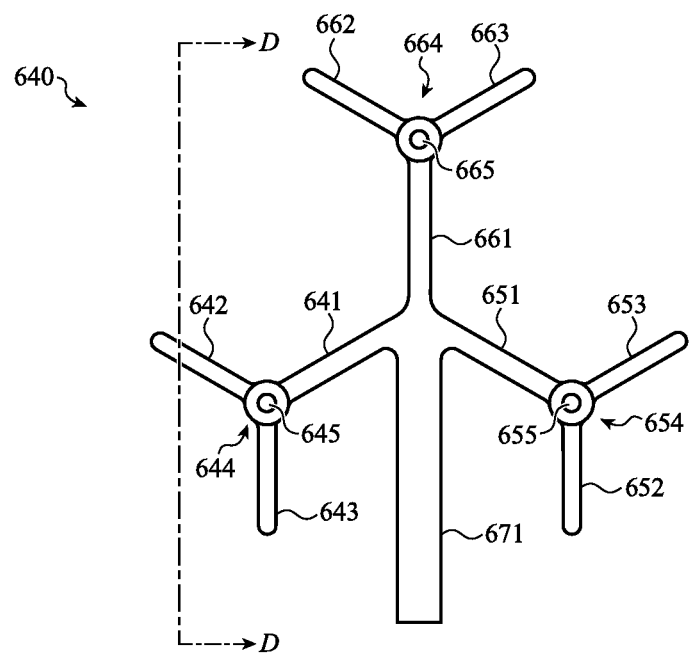
FIG. 6A is a front view of the branched strand tree device used in the manufacture of the lariat device of FIG. 3A.
Figure 6B:
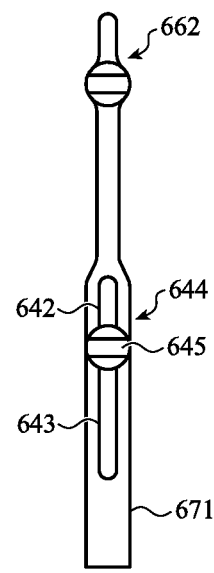
FIG. 6B is a side view of the branched strand tree device of FIG. 6A, taken along section D-D in FIG. 6A.

With attention to FIGS. 6A-B, one embodiment of the branched strand tree device 640 used in the manufacture of the lariat device is depicted. Generally, the branched strand tree device 640 comprises a trunk 671 from which three branches extend: branch one 641, branch two 651, and branch three 661. The three branches extend radially in a symmetrical manner. Stated another way, each of the three branches extend at a 120 degree radial from the trunk 671.

Each of the three branches 641, 651, 661 comprises a crotch, an aperture at the base of the crotch, and two twigs which define the crotch. More specifically, branch one 641 extends from trunk 671 to branch one aperture 645, with branch one twig one 642 and branch one twig two 643 extending from branch one aperture 645 to form a 120 degree angle and to define a branch one crotch 644. Similarly, branch two 651 extends from trunk 671 to branch two aperture 655, with branch two twig one 652 and branch two twig two 653 extending from branch two aperture 655 to form a 120 degree angle and to define a branch two crotch 654. Also, branch three 661 extends from trunk 671 to branch three aperture 665, with branch three twig one 662 and branch three twig two 663 extending from branch three aperture 665 to form a 120 degree angle and to define a branch three crotch 664. In some embodiments, one or more of crotches 644, 654, 664 are defined by a tree having more than three branches that may have more than two twigs per branch.

Generally, the system 700 comprises a head box 580, tree/cross box 530, and a tail box 510. The head box 580, tree/cross box 530, and tail box 510 are generally linearly aligned. The head box 580 is stationary or fixed. Each of the tree/cross box 530 and tail box 510 are moveable and mounted on rails to allow predicable and ready linear movement relative to one another and with respect to head box 580. The head box 580 and tail box 510 of FIG. 7 are similar to those of FIG. 5.

The tree/cross box 530 of FIG. 7 comprises a tree/cross box body 532, cross 550, branch strand tree 540, pulleys 560, and a set of four wheels 534 configured to engage the rails 504. Additionally, the tree/cross box 530 comprises a center yarn bobbin 562, center yarn twisting weight 564, center yarn twisting activator 571, outer strand twisting weight 566, and outer strand twisting activator 572. Each of the cross 550, branch strand tree 540 and pulleys 560 are generally aligned and are disposed or positioned on an upper surface of the tree/cross box body 532. In one embodiment, the tree/cross box 530 is fitted with any device to enable controlled movement relative to the tail box 510 and/or the head box 580. The center yarn bobbin 562, center yarn twisting weight 564, and center yarn twisting activator 571 may collectively be termed a center yarn assembly.

Generally, a strand tensioner in the center yarn assembly of the tree/cross box 530 holds controlled tension on each center yarn bundle when the center yarn bundle is pulled from center yarn bobbin 562 through an aperture. As the head box hooks 584 are rotated, the outer strands are twisted against the branch strand tree 540, forcing the tree/cross box 530 to move towards the tail box 510. The resulting twisted outer strands, each containing a center yarn bundle, are then twisted together against the cross 550 by a rotating hook on the tail box 510. This twisting results in the twisting of the strands against the tines or spokes of the cross 550 of the tree/cross box 530 causing the tree/cross box 530 to move, together with the tail box 510, towards the head box 580 resulting in the production of the lariat.

Generally, the center yarn twisting activator 571 operates to move the center yarn twisting weight 564, and the outer strand twisting activator 572 operates to move the outer strand twisting weight 566. The center yarn twisting activator 571 may be operated manually by a user or operator by rotation of the yarn twisting activator 571 so as to displace the center yarn twisting weight 564. The displacement of the center yarn twisting weight 564, among other things, allows the operator to set and control the resistance to movement of the tree-cross box caused by rotating the head box hooks. Also, among other things, the displacement of the center yarn twisting weight 564 results in control of the twists per inch of the strands.

Similarly, the outer strand twisting activator 572 may be operated manually by a user or operator by rotation of the outer strand twisting activator 572 so as to displace the outer strand twisting weight 566. The displacement of the outer strand twisting weight 566 allows the operator to produce, in conjunction with the center yarn twisting weight, the desired resistance to the tree cross box movement and controlling the twists per inch of the twisted strands.

In some embodiments, one or both of the outer strand twisting activator 572 and the center twisting activator 571 may be automatically and/or semi-automatically controlled. In some embodiments, one or both of the outer strand twisting activator 572 and the yarn twisting activator 571 may be power-boosted, e.g. through hydraulics, pneumatics, and the like. In some embodiments, one or both of the outer strand twisting resistance and the center yarn twisting resistance may be automatically and/or semi-automatically controlled.

In some embodiments, one or both of the outer strand twisting activator 572 and the center yarn twisting activator 571, alone or in combination with the respective outer strand twisting weight 566 and the center yarn twisting weight 564, may employ any alternate or additional mechanical or electromechanical implementation to set and control the resistance to movement of the tree-cross box caused by rotation of one or both of the head box hooks or tail box hook. Also, one or more of the afore-mentioned elements, and each of the head box 580, tree/cross box 530, and a tail box 510, may be automatically or semi-automatically operated, either locally or remotely.

In one embodiment, any commercially available device may be used to operate or control the disclosed weight lifting devices. In one embodiment, any means and/or devices may be used, such as servo-controlled slip clutches, to control the disclosed components or elements.

Different embodiments of the lariat of this disclosure may be manufactured using various combinations and designs of yarn materials (e.g. monofilament yarn materials), yarn twisting plying, and cabling. Also, different tensions while twisting allow the manufacturing of lariats with different and controlled static and dynamic characteristics.

With reference to FIGS. 3-7, an example process for the manufacture of the lariat of the disclosure will be described with reference to FIGS. 8-9. FIGS. 8A-G provide side views of steps used in the manufacture of the lariat device of FIG. 3A using the components of FIG. 7. FIGS. 9A-B depict, respectively, a first and second portions of a process 900*a* and 900*b* for manufacturing the lariat device, the process 900*a* continuing to the process 900*b* of FIG. 9A.

Generally, the method 900 for manufacturing the lariat device comprises a sequence of movements of the tree/cross box 530 between the head box 580 and the tail box 510. The method 900 is described with respect to producing a three stand lariat of the type detailed in FIGS. 3-4. However, production or manufacturing of a lariat with more than three strands, e.g. four strands, may be performed using a similar method, albeit with modifications to some components (e.g. the branched strand tree 640 would be configured with four branches, four head box hooks 584 would be employed, and three outer strand yarn spools 590 would be employed.)

The method 900 starts at step 901 and ends at step 991. The steps are notionally followed in increasing numerical sequence, although, in some embodiments, some steps may be omitted, some steps added, and the steps may follow other than increasing numerical order. Many of the steps of the method 900 are described with reference to one or more of the FIGS. 8A-G. Recall that FIG. 6A-B depicts one embodiment of the branched strand tree 540 used in the method 900 to produce the lariat device 100, 400.

The method 900 for manufacturing the lariat device generally comprises a repeating sequence of four movements of travels of the tree/cross box 530 between the head box 580 and the tail box 510. Each of the four movements of the tree/cross box 530 between the head box 580 and the tail box 510 comprises one or more steps of the process 900.

Generally, pass one comprises the threading of the outer strand yarns. Pass two comprises the completion of the outer strand threading and the threading of center yarns 141, 142, 143 to the head box 580. Pass three comprises twisting the outer strands yarns against the branched strand tree 540, 640 to form strands, each with a center yarn 141, 142, 143. Pass four comprises twisting of the completed strands against the cross 550 to complete formation of the lariat 100, 400.

The method 900 begins at step 901. Prior to beginning the method 900, yarns are loaded onto various spools and bobbins, such as outer strand yarn spools 590 and the center yarn bobbins 562. After beginning the method 900 at step 901, the method continues to step 905.

Pass One: Tree/Cross Box Travels to Tail Box

Figure 8A:
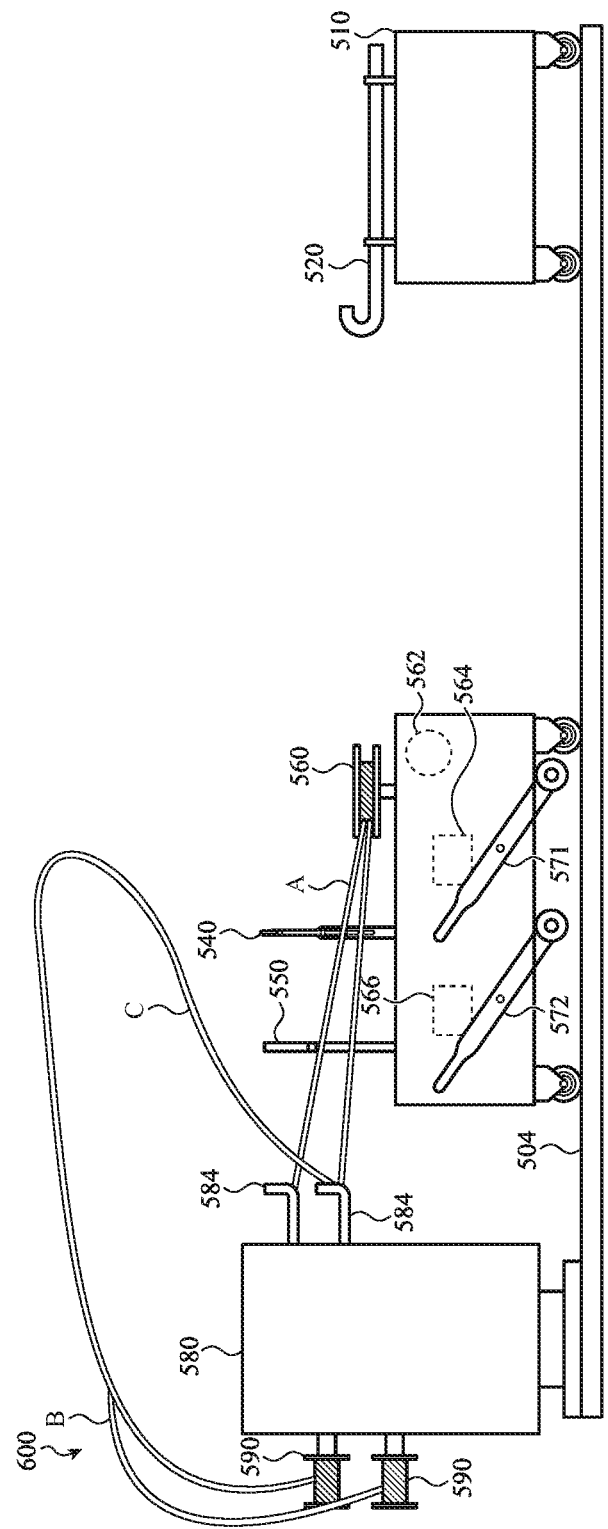
FIG. 8A is a side view of one step used in the manufacture of a lariat device using the components of FIG. 7.
Figure 9A:
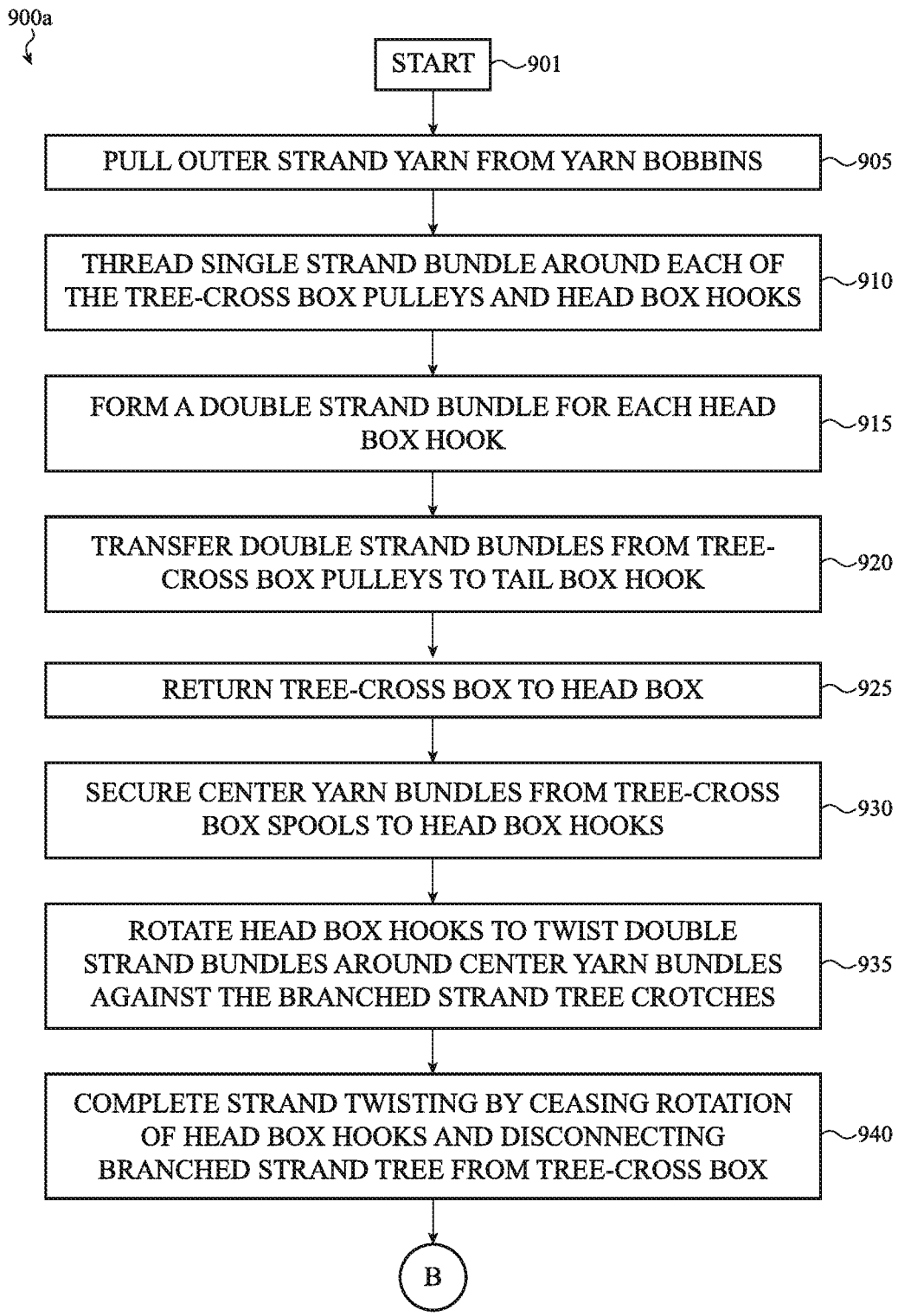
FIG. 9A depicts a first portion of a process 900a for manufacturing a lariat device, the process 900a continuing to the process 900b of FIG. 9A.
Figure 9B:
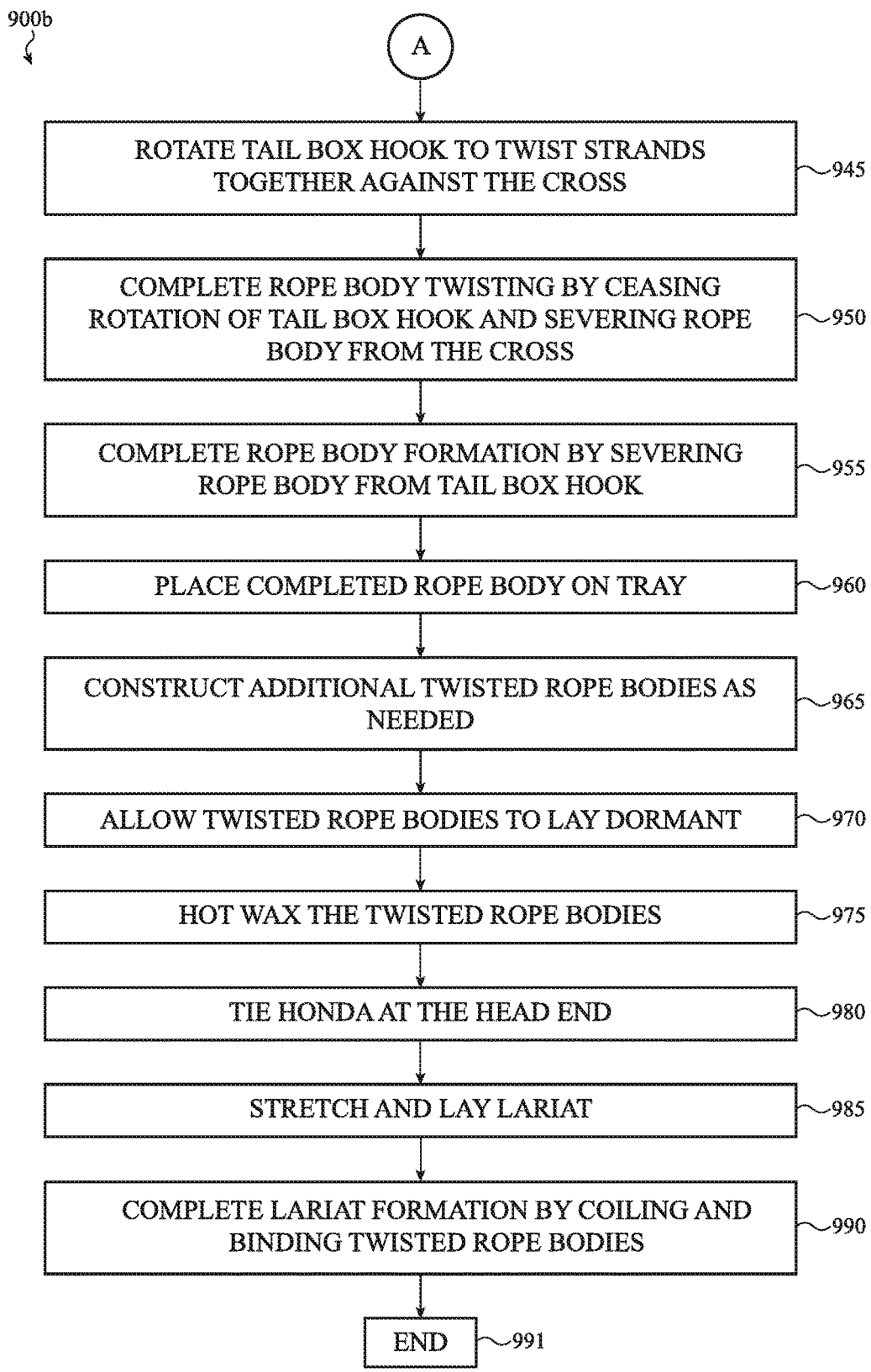
FIG. 9B depicts a second portion of a process 900b for manufacturing a lariat device, the process 900b a continuation of the process 900a of FIG. 9A.

At step 905, with reference to FIG. 8A, an operator pulls yarn from the yarn B from outer strand yarn spools 590 to form a single strand bundle, as depicted in FIG. 8A. The method 900 continues to step 910.

At step 910, with reference to FIG. 8A, the operator secures an end of the single strand bundle B to an initial head box hook 584 mounted on the head box 580, wraps the single strand bundle around one pulley 560 mounted on the tree/cross box 530 (portion A of FIG. 8A), and then wraps the single strand bundle around an unused head box hook 584. The operator continues to wrap the single strand bundle back and forth between each pulley 560 of the tree/cross box 530 and each unused head box hook 584 until the single strand bundle is around each pulley 560 of the tree/cross box 530 and a hook 584 (strand portion A of FIG. 8A). The method 900 continues to step 915.

Figure 8B:
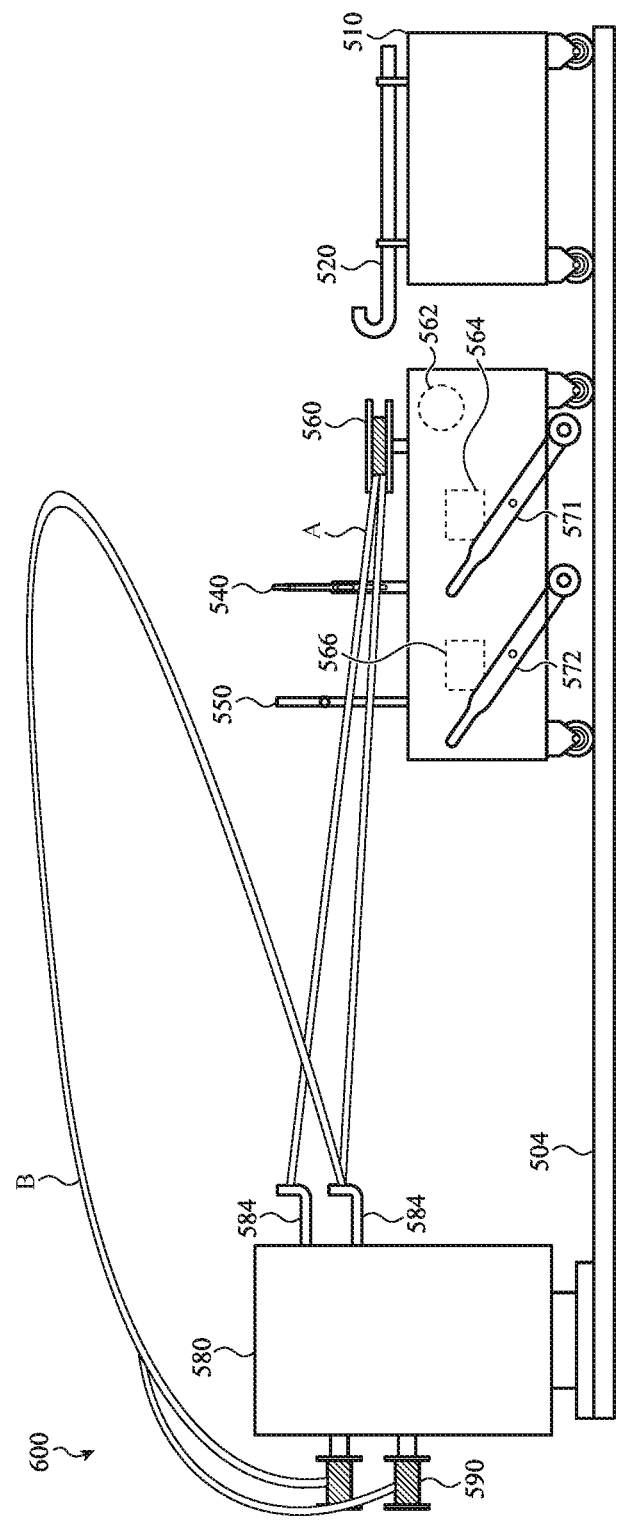
FIG. 8B is a side view of another step used in the manufacture of a lariat device using the components of FIG. 7.

At step 915, with reference to FIG. 8B, the operator moves the tree/cross box 530 toward the tail box 510, allowing the strands from the outer strand yarn spools 590 to slide through the operator's hands and around the head box hooks 584 and pulleys 560 of the tree/cross box 530. Step 915 results in the formation of a double strand bundle for each of the head box hooks 584 that the single strand bundle was secured to at the beginning of the strand yarn threading process. The method 900 continues to step 920.

Figure 8C:
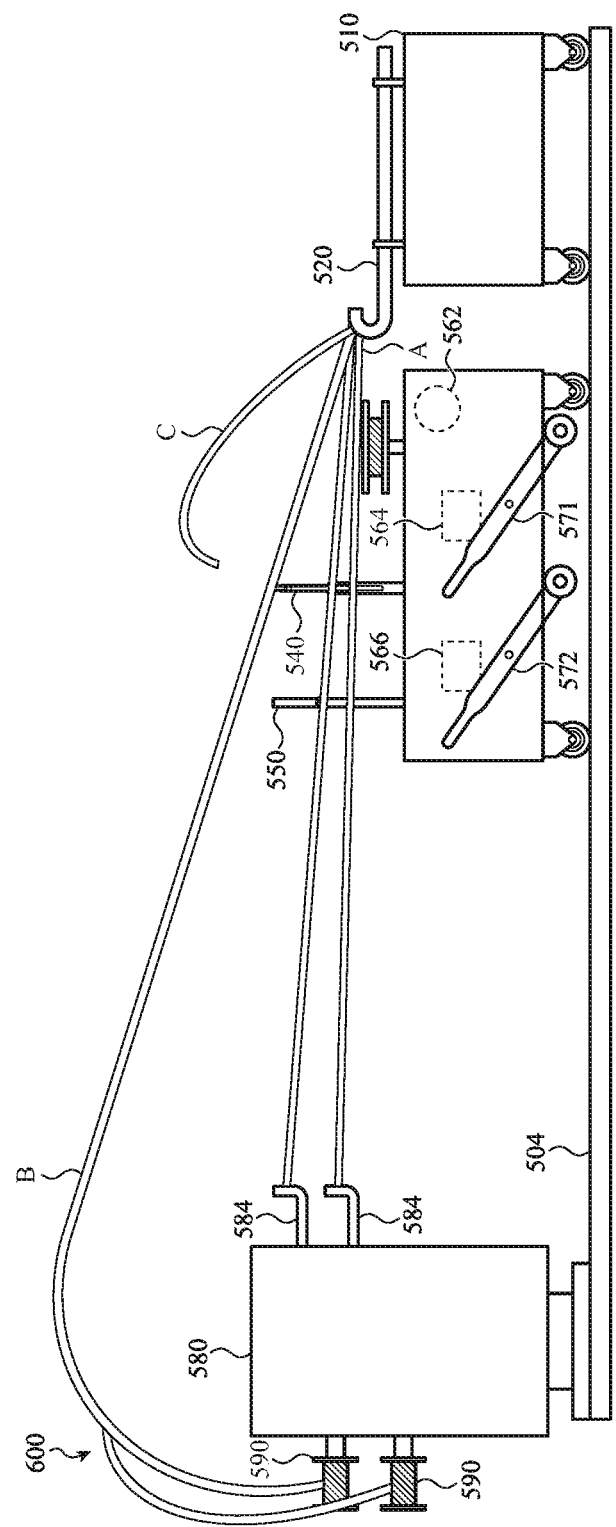
FIG. 8C is a side view of another step used in the manufacture of a lariat device using the components of FIG. 7.

At step 920, with reference to FIG. 8C, the operator manually transfers each double strand bundle from the pulleys 560 of the tree/cross box 530 to the tail box hook 520 of the tail box 510. Step 920 occurs while the operator is in close proximity to the tail box 510. At the completion of step 920, the tree/cross box 530 is positioned adjacent the tail box 510. The method 900 continues to step 925.

Pass Two: Tree/Cross Box Travels to Head Box

Figure 8D:
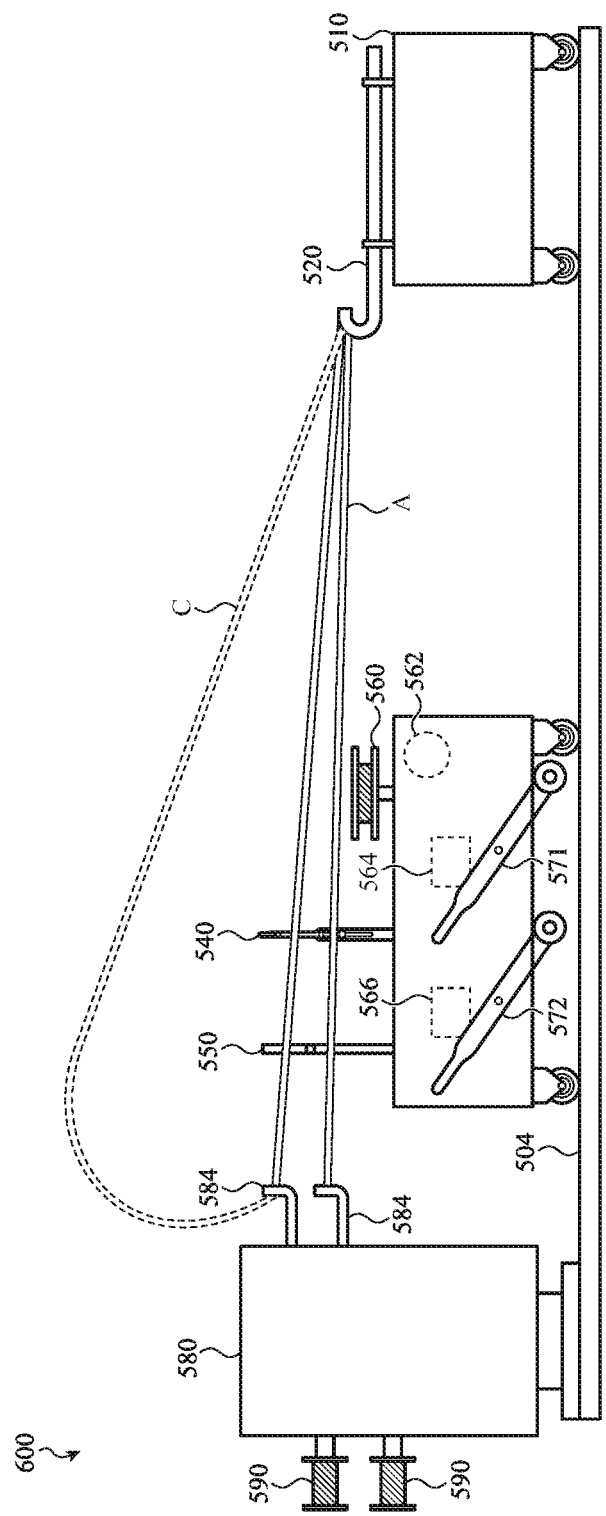
FIG. 8D is a side view of another step used in the manufacture of a lariat device using the components of FIG. 7.

At step 925, with reference to FIG. 8D, the operator moves the tree/cross box 530 back to a position adjacent the head box 580, allowing the untied single strand bundle to slide through the operator's hands. When the operator reaches the head box 580, the operator manually removes slack in the single strand bundles, and then severs and ties the single strand bundle remaining in the operator's hand to the same initial head box hook 584 that the single strand bundle was secured to at the start of the process. At the completion of step 925, the tree/cross box 530 is positioned adjacent the head box 580. The method 900 continues to step 930.

Figure 8E:
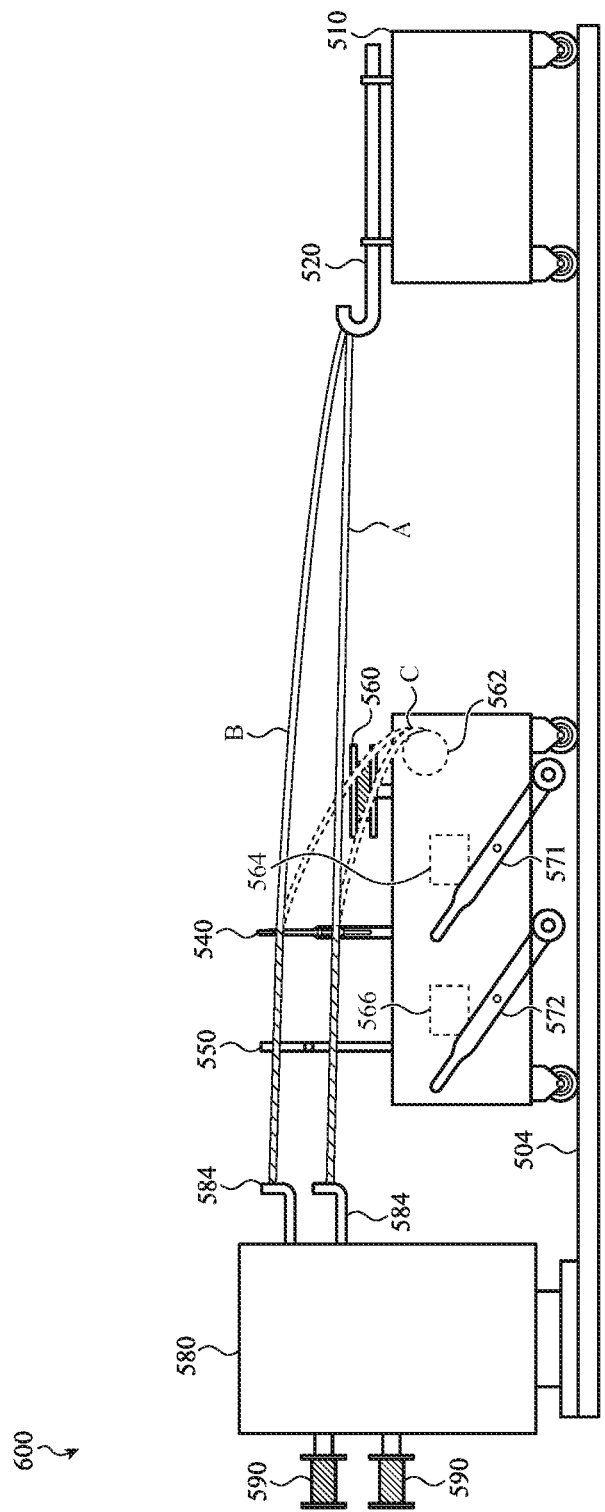
FIG. 8E is a side view of another step used in the manufacture of a lariat device using the components of FIG. 7.

At step 930, with reference to FIG. 8E, the operator pulls a center yarn bundle C from the center yarn bobbin 562, threads the center yarn bundle C through an aperture of the branched strand tree 540, 640 (that is, one of 645, 655, 665) and then ties the center yarn bundle C to its appropriate head box hook 584. This center yarn threading is repeated for each strand of the lariat (and thus using the remaining apertures of the branched strand tree 540, 640.) This action completes yarn threading. Stated another way, the center yarn bundle is fed by the operator through a respective aperture of the branched strand tree 540, 640 and tied to its strand twisting hook 584 on the head box 580 before the commencement of rotation of head box hooks 584 to begin pass three, the strand twisting pass of the tree/cross box 530 along the rails 504. At the completion of step 930, the tree/cross box 530 is positioned adjacent the head box. The method 900 continues to step 935.

Pass Three: Tree/Cross Box Travels to Tail Box

At step 935, with reference to FIG. 8E, the operator lowers the center yarn twisting activator 571 mounted on the tree/cross box 530, which in turn lowers the center yarn twisting weight 564, which results in a controlled resistance to the movement of the tree-cross box and controlling the twists per in inch of the twisted yarns and strands. Among other things, this step, involving the use of the center yarn twisting weight 564 as maneuvered by the center yarn twisting activator 571, results in a lariat with the more predictable and selectable performance characteristics.

Continuing with step 935, with reference to FIG. 8E, the operator begins rotating the head box hooks 584 so as to twist the double strand bundles around center yarn bundles against the crotches 644, 654, 664 of the branched strand tree 640. The twisting force applied against the branch strand tree 640 urges the tree/cross box 530 to move against the applied resistance and towards the tail box 510 and the length of each lariat strand to shorten between the head box 580 and tail box 510. The method 900 continues to step 940.

Figure 8F:
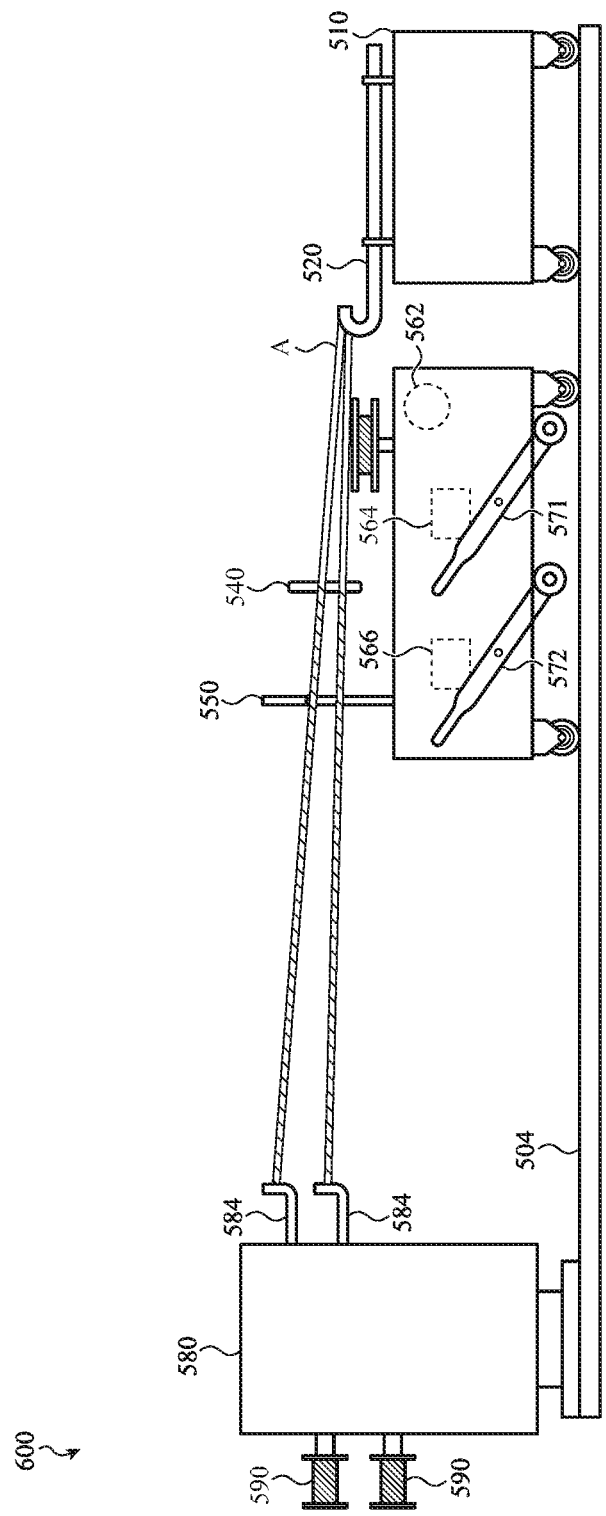
FIG. 8F is a side view of another step used in the manufacture of a lariat device using the components of FIG. 7.

At step 940, with reference to FIG. 8F, once the tree/cross box 530 reaches the tail box 510, the operator stops rotating the head box hooks 584. The operator then actuates the outer strand twisting activator 572 on the tree/cross box 530, resulting in a lowering of the outer strand twisting weight to produce the desired resistance to the tree cross box movement and controlling the twists per inch of the twisted strands. The operator then disconnects the branch strand tree 640 from the tree/cross box 530, and severs the center yarn bobbins 562 at the spools which allow the branch strand tree 640 to rotate with the tail box hook 520 when tail box hook 520 is rotated to twist the strands together. The method 900 continues to step 945.

Pass Four: Tree/Cross Box Travels to Head Box

Figure 8G:
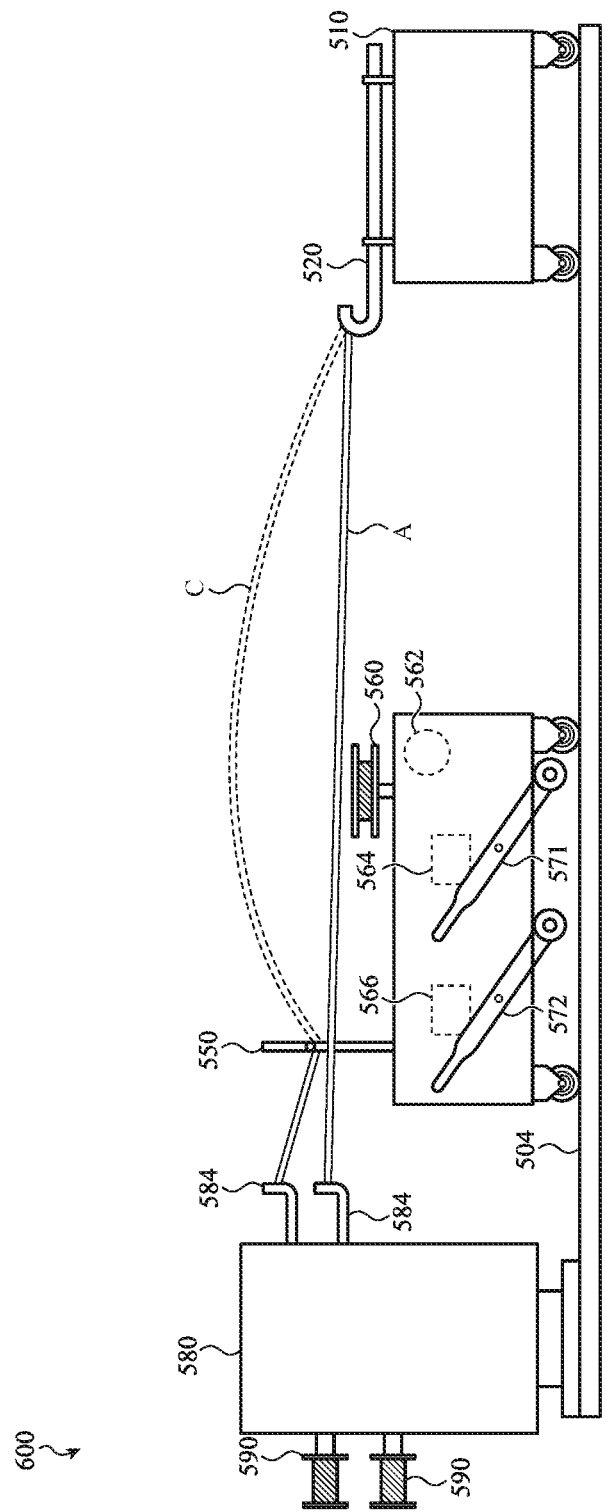
FIG. 8G is a side view of another step used in the manufacture of a lariat device using the components of FIG. 7.

At step 945, with reference to FIG. 8G, the operator begins rotating tail box hook 520 to twist the strands together against the cross 550. This strand twisting causes the strand lengths between the head box 580 and tail box 510 to shorten as the tree/cross box 530 is urged toward the head box 580 against the resistance to movement. The method 900 continues to step 950.

At step 950, with reference to FIG. 8G, once the tree/cross box 530 reaches the head box 580, the operator stops rotating the tail box hook 520. This step completes the lariat twisting to produce the lariat C of FIG. 8G. The operator wraps tape around the twisted lariat immediately behind the cross 550, removes any tension on the lariat body, and severs the lariat near the applied tape. The method 900 continues to step 955.

At step 955, the operator returns to the tail box 510, wraps tape around the twisted strands and in front to the branch strand tree 540, 640, severs the lariat body from the tail box hook 520. (In another embodiment, the operator may sever and tie the severed end to prevent unraveling of the twisted stand materials.) The operator then discards remaining yarn segments from the tail box hook 520, and reinstalls the branch strand tree 540, 640 on the tree/cross box 530. This completes lariat body twisting.

At step 960, the operator places the completed lariat body on a completed body tray for further processing. The method 900 continues to step 960.

At step 965, the operator repeats steps 905 through 960 to construct each twisted lariat body as needed to produce the desired lariat. The method 900 continues to step 970.

At step 970, the operator allows the twisted lariat bodies to lay dormant to relieve any local stresses in the yarns and strands. The method 900 continues to step 975.

At step 975, the operator hot waxes the twisted lariat bodies. The operator may then choose to allow the twisted lariat bodies to lay dormant a second time for more stress relieving. The method 900 continues to step 980.

At step 980, the operator ties the honda at the head end of the lariat before stretching. The operator may then choose to allow the twisted lariat bodies to lay dormant a third time for more stress relieving. The method 900 continues to step 985.

At step 985, the operator places one or more lariat bodies on hooks or hooks at each end of the lariat body and stretches them a set distance (e.g. 5-8 feet) to further bind the strands together and further relieving remaining localized stress concentrations along the body. Optionally, the lariat may again be laid dormant to further relieve stress concentrations. The method 900 continues to step 990.

At step 990, the operator threads the tail of the lariat body through the honda and coils and binds the twisted lariat bodies into completed lariat. The method 900 continues to step 991. At step 991, the method 900 ends.

In some embodiments, one or more of the steps of the method of manufacturing the lariat, to include steps of the method 500, may comprise computer control, use of computer processors, and/or some level of automation.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to energy storage containers. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing a lariat comprising:
providing a head box comprising a plurality of head box hooks, a plurality of outer strand yarn spools, and a plurality of yarns coupled to the outer strand yarn spools;
providing a tree-cross box comprising a cross and a branch strand tree, the branch strand tree comprising a plurality of crotches;
providing a tail box comprising a tail hook;
connecting the plurality of yarns between the head box hooks and the tail hook to form a plurality of outer strand bundles;
contacting and twisting each of the plurality of outer strand bundles against a respective crotch of the plurality of crotches; and
twisting a plurality of strands comprising the plurality of outer strand bundles against the cross, wherein a lariat device is made.

2. The method of claim 1, wherein the tree-cross box further comprises at least two twisting weights, each of the at least two twisting weights configured to impart a controlled twist to the plurality of outer strand bundles when twisting against the respective crotch of the branch strand tree and when twisting against the cross.

3. The method of claim 2, wherein:
the tree/cross box further comprises at least two twisting activators, each twisting activator connected with and configured to displace a twisting weight; and
the tree-cross box is moveable.

4. The method of claim 1, wherein each of the tree-cross box and the tail box are moveable and each engage a pair of rails.

5. The method of claim 1, wherein the plurality of head box hooks are three head box hooks, and the plurality of outer strand yarn spools are three outer strand yarn spools.

6. The method of claim 1, wherein the plurality of strands are three strands.

7. The method of claim 6, wherein one of the tail box and the head box are moveable.

8. The method of claim 1, wherein the branch strand tree is detached from the tree-cross box after the step of contacting and twisting each of the plurality of outer strand bundles against the respective plurality of crotches.

9. The method of claim 1, wherein:
the branch strand tree further comprises a plurality of apertures, each aperture formed adjacent a respective crotch;
each of the plurality of outer strand bundles surround a respective center yarn bundle; and
each center yarn bundle passes through a respective aperture of the plurality of apertures during the contacting and twisting step.

10. A method of making a lariat device comprising:
providing a head box comprising a set of head box hooks, a set of outer strand yarn spools, and a set of yarns coupled to the outer strand yarn spools;
providing a tree-cross box comprising a cross and a branch strand tree, the branch strand tree comprising a trunk portion comprising at least three branches extending from the trunk, each branch comprising at least two twigs extending from a respective branch, wherein each of the at least two twigs form a crotch with an aperture configured to receive a yarn or a strand through the aperture;
providing a tail box comprising a tail hook;
connecting the set of yarns between the head box hooks and the tail hook to form a set of strands;
coupling each of the set of strands with a set of crotches of the branch strand tree; and
twisting the set of strands, wherein a lariat device is made.

11. The method of claim 10, wherein the tree-cross box further comprises at least two twisting weights, each of the at least two twisting weights configured to impart a controlled twist to the set of strands when the set of strands are coupled to the set of crotches of the branch strand tree and when the set of strands are twisted against the cross.

12. The method of claim 10, wherein the at least three branches are three branches, and the at least two twigs are two twigs.

13. The method of claim 10, wherein the set of yarns comprise multifilament and monofilament yarn materials.

14. The method of claim 10, wherein the set of strands are three strands.

15. The method of claim 10, further comprising the step of moving one of the tail box and the head box.

16. The method of claim 14, wherein:
the three strands have a twist of at least 2.0 twists per inch along an axial length of the lariat device, and
the branch strand tree is detached from the tree-cross box after the step of coupling each of the set of strands with the set of crotches of the branch strand tree.

17. A method of making a lariat device comprising:
providing a head box comprising three or more head box hooks, three or more outer strand yarn spools, and three or more yarns coupled to the outer strand yarn spools;
providing a moveable tree-cross box comprising a cross and a branch strand tree, the branch strand tree comprising a trunk portion comprising at least three branches extending from the trunk, each branch comprising at least two twigs extending from a respective branch, wherein each of the at least two twigs form a crotch with an aperture configured to receive a yarn or a strand through the aperture;
providing a tail box comprising a tail hook;
connecting the three or more yarns between the head box hooks and the tail hook to form three strands;
coupling each of the three strands with a respective crotch of the branch strand tree;
detaching the branch strand tree from the tree-cross box; and
twisting the three strands.

18. The method of claim 17, wherein:
the tree-cross box further comprises at least two twisting weights, each of the at least two twisting weights configured to impart a controlled twist to the three strands when the three strands are coupled to the respective crotches of the branch strand tree and when the three strands are coupled to the cross; and the tree-cross box further comprises at least two twisting activators, each twisting activator connected with and configured to displace a twisting weight.

19. The method of claim 17, wherein the three or more head box hooks are three head box hooks, and the three or more outer strand yarn spools are three outer strand yarn spools.

20. The method of claim 19, wherein each of the tree-cross box and the tail box are linearly moveable.

* * * * *